(12) United States Patent
Wall

(10) Patent No.: US 12,403,840 B2
(45) Date of Patent: Sep. 2, 2025

(54) VEHICLE HITCH MOUNTABLE DEVICE FOR LIFTING OBJECTS

(71) Applicant: Kevin Wall, Seattle, WA (US)

(72) Inventor: Kevin Wall, Seattle, WA (US)

( * ) Notice: Subject to any disclaimer, the term of this patent is extended or adjusted under 35 U.S.C. 154(b) by 353 days.

(21) Appl. No.: 18/109,869

(22) Filed: Feb. 15, 2023

(65) Prior Publication Data

US 2023/0286442 A1    Sep. 14, 2023

Related U.S. Application Data

(60) Provisional application No. 63/317,826, filed on Mar. 8, 2022.

(51) Int. Cl.
*B60R 9/06*  (2006.01)
*B66F 3/44*  (2006.01)

(52) U.S. Cl.
CPC . *B60R 9/06* (2013.01); *B66F 3/44* (2013.01)

(58) Field of Classification Search
CPC .. B60D 1/46; B60D 1/465; B60R 9/06; B60R 9/10; B66F 3/44; B60P 1/4421; B60P 1/4428
USPC .................................................. 224/519–521
See application file for complete search history.

(56) References Cited

U.S. PATENT DOCUMENTS

| | | | | |
|---|---|---|---|---|
| 4,741,660 | A * | 5/1988 | Kent | A61G 3/0209 414/622 |
| 5,011,361 | A * | 4/1991 | Peterson | B60R 9/06 224/508 |
| 6,579,055 | B1 * | 6/2003 | Williams | B60P 3/07 414/462 |
| 6,824,156 | B2 * | 11/2004 | Smith | B60D 1/52 280/490.1 |
| 7,287,299 | B2 * | 10/2007 | Joynt | A47L 11/30 15/340.1 |
| 7,798,502 | B2 * | 9/2010 | Sukey | B62B 3/10 108/50.01 |
| 12,091,242 | B2 * | 9/2024 | Bee | B65F 1/122 |
| 12,214,633 | B1 * | 2/2025 | Jefferies | B60D 1/465 |
| 2004/0256833 | A1 * | 12/2004 | Cervenka | B60R 3/007 280/163 |

* cited by examiner

*Primary Examiner* — Adam J Waggenspack
(74) *Attorney, Agent, or Firm* — Alloy Patent Law; Walker Griffin Weitzel

(57) ABSTRACT

The present disclosure relates a device for lifting objects. The device comprises a pair of arms, a horizontal bar, a slide bar, and a housing. The pair of arms are configured to be in an open state to lift an object and in a closed state when the pair of arms are not being used. The device is configured to be elongated to a length for providing ease of loading and unloading of an object. The device further comprises a locking mechanism for providing stability during transit. The housing comprises a roller over a screw for providing easy displacement of the slide bar with respect to the housing.

22 Claims, 14 Drawing Sheets

VEHICLE HITCH MOUNTABLE DEVICE FOR LIFTING OBJECTS

CROSS-REFERENCE TO RELATED APPLICATIONS

The present application hereby claims priority to and incorporates by reference the entirety of the disclosures of the provisional application No. 63/317,826 entitled "VEHICLE HITCH MOUNTABLE DEVICE FOR LIFTING OBJECTS" filed on 8 Mar. 2022.

FIELD

The present disclosure generally relates to a device for lifting objects. More particularly, the present disclosure relates to a device attachable to a vehicle hitch receiver and adapted for lifting objects.

BACKGROUND

The use of personal vehicles for transportation is quite widespread. Recently, people have started to use their personal vehicles for long-distance and long-duration travel instead of travelling by airplanes or trains. In such situations, the luggage tends to be more. People generally use overhead carrier or storage compartments inside the vehicle for carrying their luggage. However, the use of overhead carrier requires use of securing arrangements which do not necessarily hold the luggage in a secure manner. Further, luggage stored inside a vehicle occupies a lot of space. Hence, these options are not feasible for carrying large luggage. Furthermore, people may want to transport large number of goods, for instance, wholesale goods, as well as heavy objects, on their own instead of hiring transport services to save costs of transportation.

For such reasons, people use attachment of external support structures with the vehicles to carry objects. Such support structure is generally known as hitch. Different types of hitches are available which are attached to hitch receivers at the rare end of vehicles to carry objects. All the hitches have different structures and methods to operate. The hitches generally include carry arms or forks to carry objects. For loading and unloading of objects, the carry arms or forks are displaceable using different mechanisms. Some available hitches use motor-chain assembly or motor-flexible member assembly. The design of such displacement arrangement is very complex with different mechanical parts, which make such hitches difficult to maintain. For example, regular servicing, or oiling, of such mechanical parts is required. Other hitches use inbuilt jacks or motors with battery for such displacement, adding complexity to the design. Further, when not in use, the carry arms or the forks are folded. Different mechanisms for folding the carry arms are used, such as brackets, pins and holes in which arms are detached and holes and brackets are aligned for reattaching the arms in different orientation. In some hitches, hinges are used for folding the arms when they are not used. Such designs for folding the arms are complex and time-consuming.

Furthermore, in case of objects with heavy load, the arms tend to bend due to the load. There is no provision in existing hitches to address such issue. Moreover, in such case of heavy load, more energy is required in conventional hitches to lift the arms. Moreover, stability and secure locking of objects are other non-addressed issues with the existing hitches. Hence, while such support structures or hitches are available, there are limitations associated with the available structures, such as limited object carrying capacity, complex structure, insecure connection, and the like.

SUMMARY

While the way that the present disclosure addresses the disadvantages of the prior art will be discussed in greater detail below, in general, the present disclosure provides a device attachable to a vehicle and configured for lifting objects.

An object of the present disclosure is to provide a device which is simple in structure.

Another object of the present disclosure is to provide a device which is easy to use.

Yet another object of the present disclosure is to provide a device which uses less energy while lifting objects.

Yet another object of the present disclosure is to provide a device which provides greater stability to the objects in transit.

Yet another object of the present disclosure is to provide a device which restricts movement of the objects, thereby providing security of the objects while in transit.

Further object of the present disclosure is to provide a device which provides locking of the device in a specific state to prevent rattles during transit.

Further object of the present disclosure is to provide a device which provides latching of the device in case of carrying objects with heavy load.

Further object of the present disclosure is to provide a device which can be attachable to different types of vehicles.

Further object of the present disclosure is to provide a device which can lift different types of objects.

Further object of the present disclosure is to provide a device which does not require any special skill for operating the device.

Further object of the present disclosure is to provide a device which changes states quickly, and hence, saves time.

Further object of the present disclosure is to provide a device that utilizes electricity, thereby preventing manual labor and/or effort.

The device in accordance with the present disclosure comprises a pair of arms, a horizontal bar, a slide bar, and a housing. The pair of arms are configured to be in an open state while carrying an object and in a closed state while not being used. The pair of arms are coupled with the horizontal bar using a coupling mechanism. The coupling mechanism is present at proximal and distal portions of the horizontal bar.

In an embodiment, the coupling mechanism comprises a spring plunger pin, a clevis pin, and a cotter pin. The clevis pin and the cotter pin engage with walls of the proximal portion and distal portion of the horizontal bar and the pair of arms to couple the arms with the horizontal bar such that free movement of the pair of arms with respect to the horizontal bar is achieved. Hence, the pair of arms may change state from an open state to a closed state and vice versa. For restricting the pair of arms in the open state or the closed state, the pair of arms comprises a first notch and a second notch for the spring plunger pin to attach therewith. In the open state, the spring plunger pin passes through a hole from the corresponding wall of the horizontal bar and is attached to the first notch. Hence, the movement of the pair of arms is restricted and the pair of arms remains in the open state. To change the state of the pair of arms, the spring plunger pin is pulled and is attached to the second notch on the pair of arms. Hence, the movement of the pair of arms is restricted and the pair of arms remain in the closed state.

In an embodiment, a slide bar is coupled with the horizontal bar at substantially middle. The slide bar is configured to be housed in a housing. The slide bar is configured to be displaced from a retracted state to an elongated state and vice versa. For the same, a threaded rod is attached to the slide bar. By rotating the threaded rod, the slide bar may be displaced to the retracted state and to the elongated state.

In an embodiment, the housing comprises a plurality of walls and a screw and a roller attachment at a proximal end of the housing. The roller is configured to reduce (lessen) a friction applied for the displacement of the slide bar. Hence, less energy is used in displacing the slide bar in the retracted state when an object is carried by the pair of arms. The housing further comprises an attachment mechanism for the threaded rod. The attachment mechanism may comprise a plurality of nuts and bolts, one or more bearing, a top plate, and a hex nut. The hex nut is configured to be placed at a distal end of the housing. The rotation of the threaded rod is achieved by rotating the hex nut of the housing. The hex nut may be rotated manually by a wrench, automatically by a motor, or semi-automatically by a handheld drill motor.

In an embodiment, the horizontal bar comprises wedges at a bottom wall. The wedges are configured to restrict displacement of the slide bar in the housing after a predefined level. The wedges work as an obstacle in the displacement. While transiting in the retracted state, the slide bar reaches till the wedges. The further displacement of the slide bar results in a pushing force on the wedges, resulting in bending the wedges. This action results in secure connection of the slide bar with respect to housing, thereby providing stability while transiting with objects.

In an embodiment, the housing comprises a locking mechanism at a distal portion. When the slide bar is displaced to the retracted state, the locking mechanism may be used to lock the slide bar with the housing. This prevents accidental pulling of the slide bar when an object is placed on the pair of arms.

In an embodiment, the device may be used to load and unload an object when the slide bar is in the elongated state. While transiting, the slide bar may be displaced to the retracted state for stability and security of the object.

In an embodiment, the device comprises an insert for attachment of the device with a hitch receiver of vehicles. The insert may be of a rectangular cross-section and may be attached to the hitch receiver by conventional methods.

The present disclosure overcomes the drawbacks of the existing devices by providing a simple and easy to use device for lifting and transiting objects from one place to another. Further, the device provides greater stability to the objects. The device further ensures safe transit by preventing rattles during transit. Furthermore, because of use of the threaded rod and the roller, energy required for the displacement of the pair of arms is very less.

BRIEF DESCRIPTION OF THE DRAWINGS

A more complete understanding of the present disclosure may be derived by referring to the detailed description and claims when considered in connection with the Figures, wherein like reference numerals refer to similar elements throughout the Figures.

DETAILED DESCRIPTION

The following description is of exemplary embodiments of the invention only, and is not intended to limit the scope, applicability, or configuration of the invention. Rather, the following description is intended to provide a convenient illustration for implementing various embodiments of the invention. As will become apparent, various changes may be made in the function and arrangement of the elements described in these embodiments without departing from the scope of the invention as set forth herein. It should be appreciated that the description herein may be adapted to be employed with alternatively configured devices having different shapes, components, attachment mechanisms and the like and still fall within the scope of the present invention. Thus, the detailed description herein is presented for purposes of illustration only and not of limitation.

Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

Figure 1:
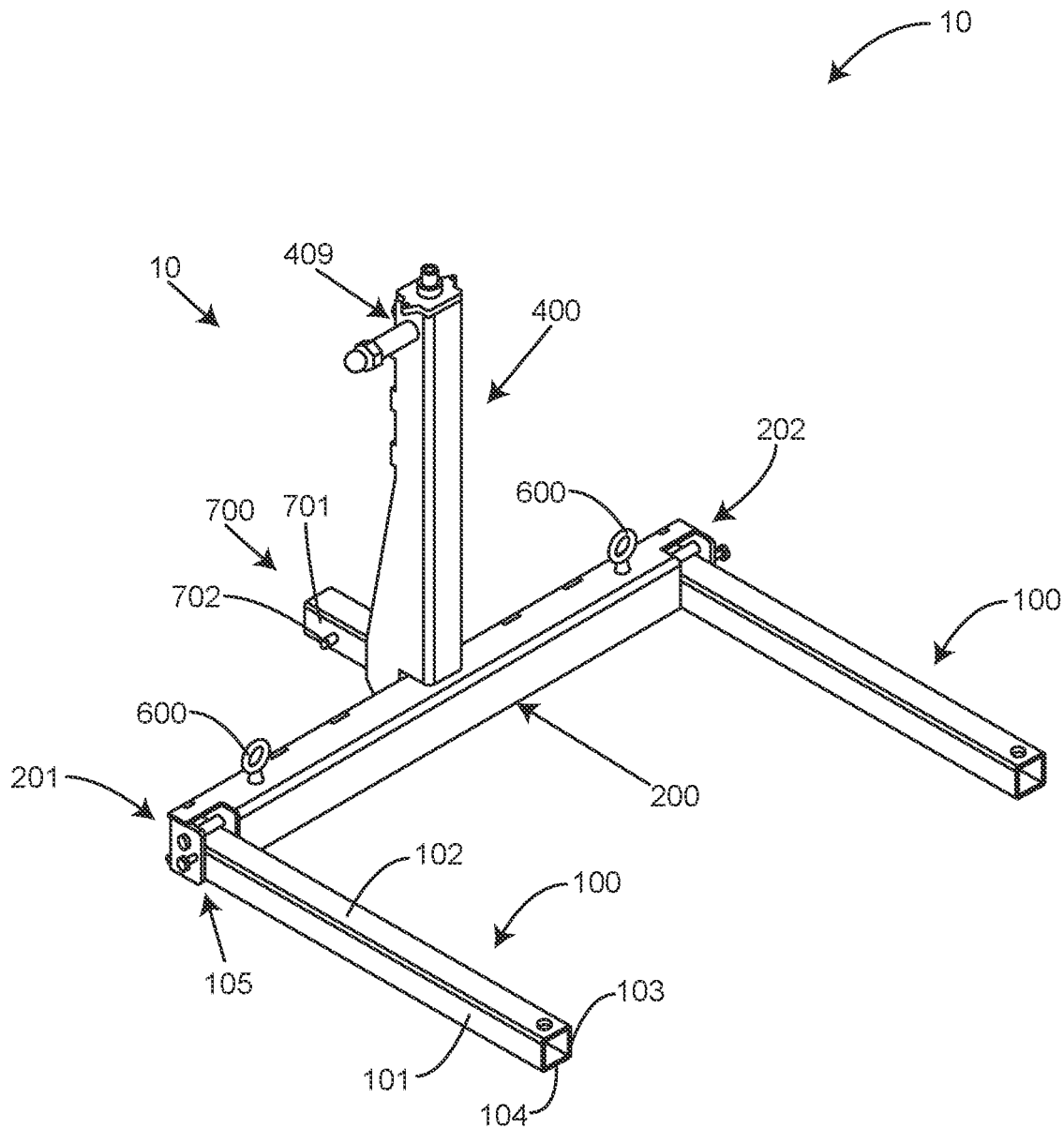
FIG. 1 illustrates a perspective view of a device for lifting objects according to one embodiment of the present disclosure.

Reference is initially made to FIG. 1 which illustrates a perspective view of the device 10, in accordance with an embodiment of the present disclosure. The device 10 comprises a pair of arms 100 to provide support to objects and for lifting the objects. The term 'objects' as used in the present disclosure is intended to items that are to be lifted and carried, such as heavy luggage, a toolbox, a bike, a pallet, a wheelchair, a camping gear, a hunting gear and the like.

In the illustrated embodiment, each arm of the pair of arms 100 is a four walled structure having a rectangular cross-section. That is, each arm of the pair of arms 100 comprises a first wall 101, a second wall 102, a third wall 103 opposite to the first wall 101, and a fourth wall 104 opposite to the second wall 102. The first wall 101, the second wall 102, the third wall 103, and the fourth wall 104 are attached with each other so as to form the arms having a rectangular cross section. In some embodiments, a width of each wall forming the arms is about 2 inches, thereby the arms assuming a squared configuration. In some embodiments, a length of each of the pair of arms 100 is about 21 inches. As used herein, the term 'about' is meant to encompass deviation of +10% from the specifically mentioned value of a parameter, such as length and width.

The device 10 comprises a horizontal bar 200 comprising a proximal portion 201 and a distal portion 202. Each of the pair of arms 100 is configured to be coupled with the horizontal bar 200, in that, one arm of the pair of arms 100 is configured to be coupled to the proximal portion 201 of the horizontal bar 200 and the other arm of the pair of arms 100 is configured to be coupled to the distal portion 202 of the horizontal bar 200. Each of the pair of arms 100 comprises a distal end 105 at which the arms are coupled to the horizontal bar 200. In the illustrated embodiment, for coupling of the arms and the horizontal bar 200, each of the pair of arms 100 comprises a hollow passage, as will be described in detail further below.

Each of the pair of arms 100 are configured to shift between an open state and a closed state. The open state of the pair of arms 100 is a state in which the pair of arms 100 are placed substantially parallel to the ground and are configured to carry an object thereon, for instance, as illustrated in FIG. 1. In other words, the device 10 is configured to support an object placed on the pair of arms 100, and further, lift the object placed on the pair of arms 100 when the pair of arms 100 are in the open state. In the closed state, the pair of arms 100 are substantially perpendicular to the ground. In other words, when the device 10 is not being used to lift an object, the pair of arms 100 are configured to be in the closed state. The transition of each of the pair of arms 100 between the open state and the closed state is achieved by a coupling mechanism 207. The device 10 comprises a coupling mechanism at both the proximal portion 201 and the distal portion 202 of the horizontal bar 200 to attach the pair of arms 100. In some embodiments, each of the pair of arms 100 is configured to be in an individual open state and an individual closed state and is configured to shift between the states using the corresponding coupling mechanism.

Figure 2:
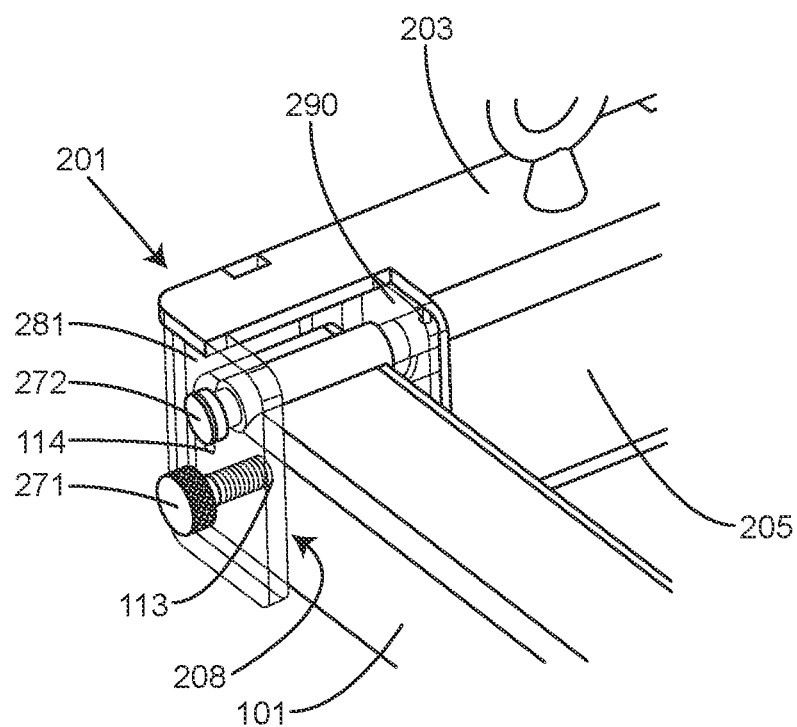
FIG. 2 illustrates an exemplary coupling mechanism when a pair of arms are in an open state, in accordance with an embodiment of the present disclosure.
Figure 3:
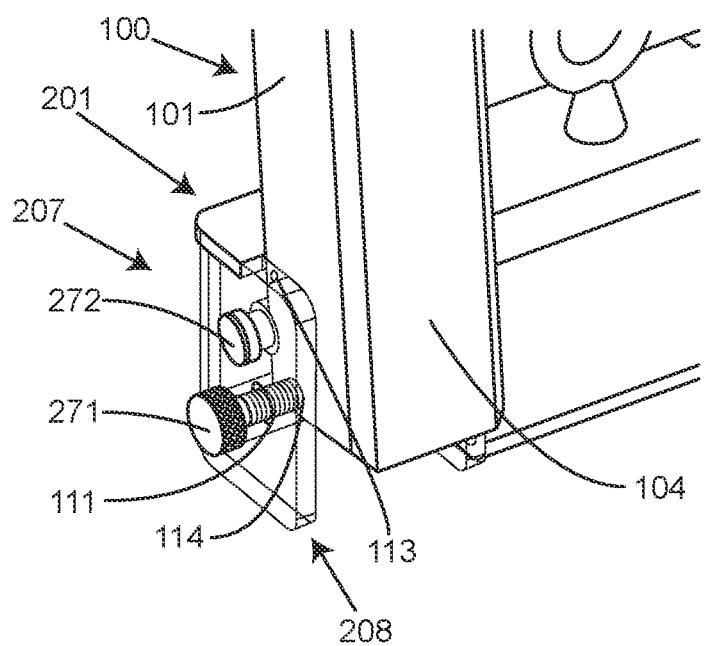
FIG. 3 illustrates an exemplary coupling mechanism when a pair of arms are in a closed state, in accordance with an embodiment of the present disclosure.

FIGS. 2-6 illustrate an exemplary coupling mechanism 207 in accordance with an embodiment of the present disclosure. FIG. 2 illustrates a coupling mechanism 207 at the proximal portion 201 of the horizontal bar 200 having the corresponding arm of the pair of arms 100 in the open state. FIG. 3 illustrates the coupling mechanism 207 at the proximal portion 201 of the horizontal bar 200 having the corresponding arm of the pair of arms 100 in the closed state.

The coupling mechanism 207 is configured to couple the pair of arms 100 with the horizontal bar 200 and facilitate transition of the pair of arms 100 from the open state to the closed state, and vice versa. The coupling mechanism 207 comprises a spring plunger pin 271, a clevis pin 272, and a cotter pin 273 (seen in FIG. 4). In order for more effective functionality of the coupling mechanism 207, a coupling structure 208 may be provided at the proximal portion 201 and the distal portion 202 of the horizontal bar 200. As seen in FIGS. 2-3, the coupling structure 208 comprises an outer surface 281 and an inner surface 290 formed at the proximal portion 201 of the horizontal bar 200. It is appreciated that the outer surface 281 and the inner surface 290 are spaced from each other to allow a corresponding arm to be received therein. That is, dimensions of coupling structure 208 at the proximal portion 201 corresponds to dimension of a corresponding arm of the pair of arms 100, so as to receive each of the corresponding arm therewithin.

In order to facilitate coupling of the corresponding arm to the horizontal bar 200, each of the outer surface 281 and the inner surface 290 of the coupling structure 208 comprises a hole 285 (best seen in FIG. 6) corresponding to the hollow passage 111 provided at the corresponding arm of the pair of arms 100. In other words, the first hollow passage 111 provided at the distal end 105 of the corresponding arm of the pair of arms 100 coincides with the hole 285 of the inner surface 290 and outer surface 281 of the coupling structure 208 at the proximal portion 201 of the horizontal bar 200. By virtue of the hollow passage coinciding with holes in the surfaces of the coupling structure 208, a single pin can be passed therethrough for coupling of the corresponding arm to the proximal portion 201 of the horizontal bar 200.

Figure 4:
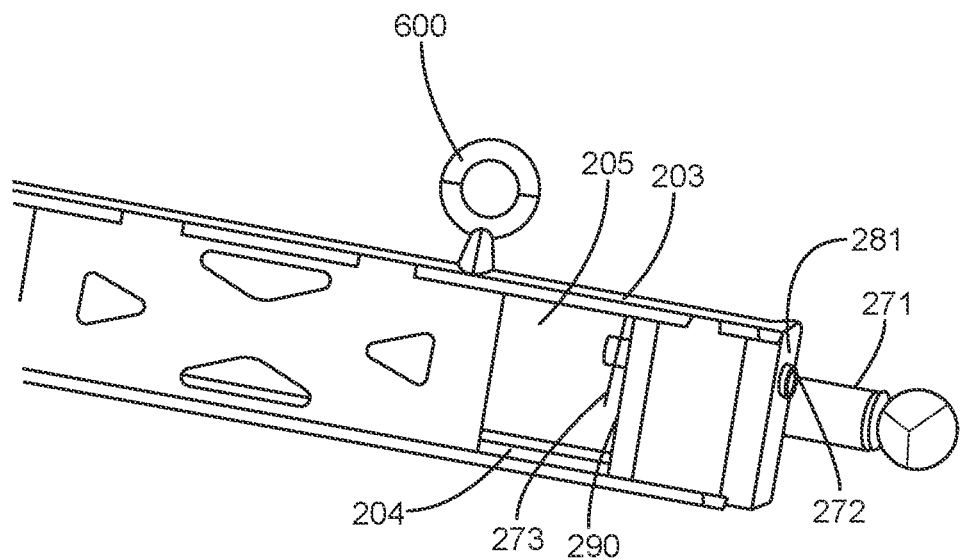
FIG. 4 illustrates an exemplary rear perspective view of the coupling mechanism of FIG. 2 and FIG. 3.

For instance, for coupling of the corresponding arm with the proximal portion 201 of the horizontal bar 200, the clevis pin 272 is passed through the respective holes in the corresponding arm and the coupling structure, and further, the cotter pin 273 is engaged at a through hole of the clevis pin 272 for ensuring the coupling of the corresponding arm with the horizontal bar 200. FIG. 4 illustrates an exemplary rear perspective view of the corresponding arm coupled to the proximal portion 201 of the horizontal bar 200 with the clevis pin 272 and the cotter pin 273. The use of clevis pin 272 and the cotter pin 273 facilitates easy and simple coupling between the arm and the horizontal bar 200. Further, a flexible movement of the arm is achieved through such coupling.

It is to be noted that although the coupling mechanism 207 and coupling structure 208 has been described with reference to the proximal portion 201, the distal portion 202 of the horizontal bar 200 comprises a similar coupling mechanism 207 and coupling structure 208 in order to couple the other arm of the pair of arms 100 with the horizontal bar 200.

For locking the pair of arms 100 in the open state or the closed state, the outer surface of the coupling structure 208 at proximal portion 201 of the horizontal bar 200 comprises an opening 284 (best seen in FIG. 6) to pass the spring plunger pin 271 therethrough. For locking the pair of arms 100 in the open state, the corresponding arm comprises a first notch 113 (best seen in FIG. 3) for receiving the spring plunger pin 271 in the open state. The first notch 113 can be provided at the first wall 101 of the corresponding arm. Similarly, for locking the corresponding arm in the closed state, the first wall 101 of the corresponding arm comprises a second notch 114 (best seen in FIG. 2) for receiving the spring plunger pin 271 in the closed state. The first notch 113 and the second notch 114, on the first wall of the corresponding arms, can be placed at a suitable position with respect to the hole of the clevis pin 272. For changing a state of the corresponding arm, the spring plunger pin 271 is pulled and inserted into a desired notch. For example, for changing the state of the corresponding arm from the open state to the closed state, the spring plunger pin 271 is pulled and inserted into the second notch 114. Similarly, for changing the state of the corresponding arm from the closed state to the open state, the spring plunger pin 271 is pulled and inserted into the first notch 113. Hence, the first notch 113 is configured to restrict movement of the arm in the open state, and the second notch 114 is configured to restrict movement of the arm in the closed state. Such restriction of movement in the open state prevents accidental closure of the pair of arms 100 when in the open state and facilitates stability to the device 10 in the open state as well as the closed state. It is to be noted that the device 10 comprises a similar coupling mechanism 207 at the distal portion 202 of the horizontal bar 200. Hence, the coupling mechanism 207 is configured to control movement of the pair of arms 100. Accordingly, the coupling mechanism 207 provides advantage of quick folding and unfolding of the pair of arms 100. Hence, a process of changing states of the pair of arms 100 is quick and easy, and hence, saves time.

Figure 5:
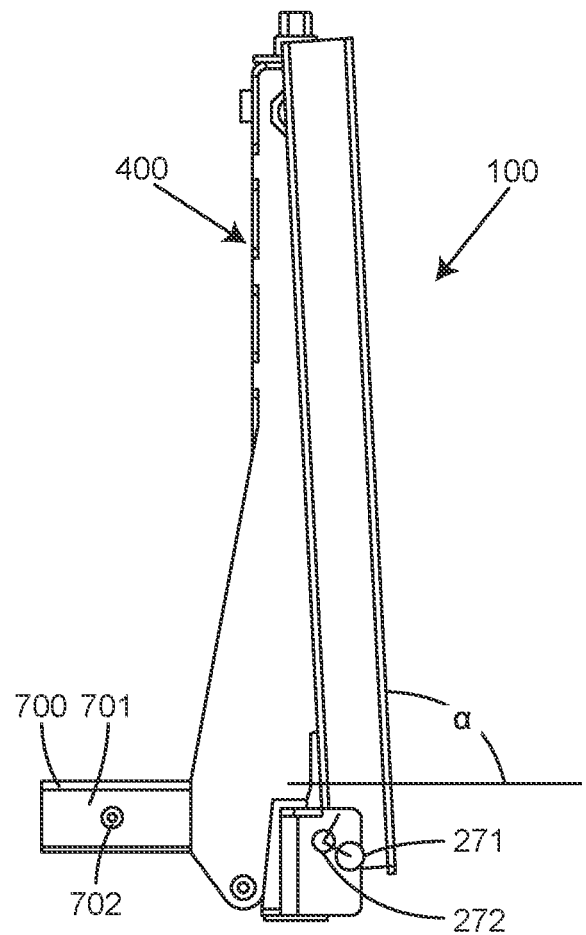
FIG. 5 illustrates an exemplary side view of a device having the pair of arms in the closed state, in accordance with an embodiment of the present disclosure.
Figure 6:
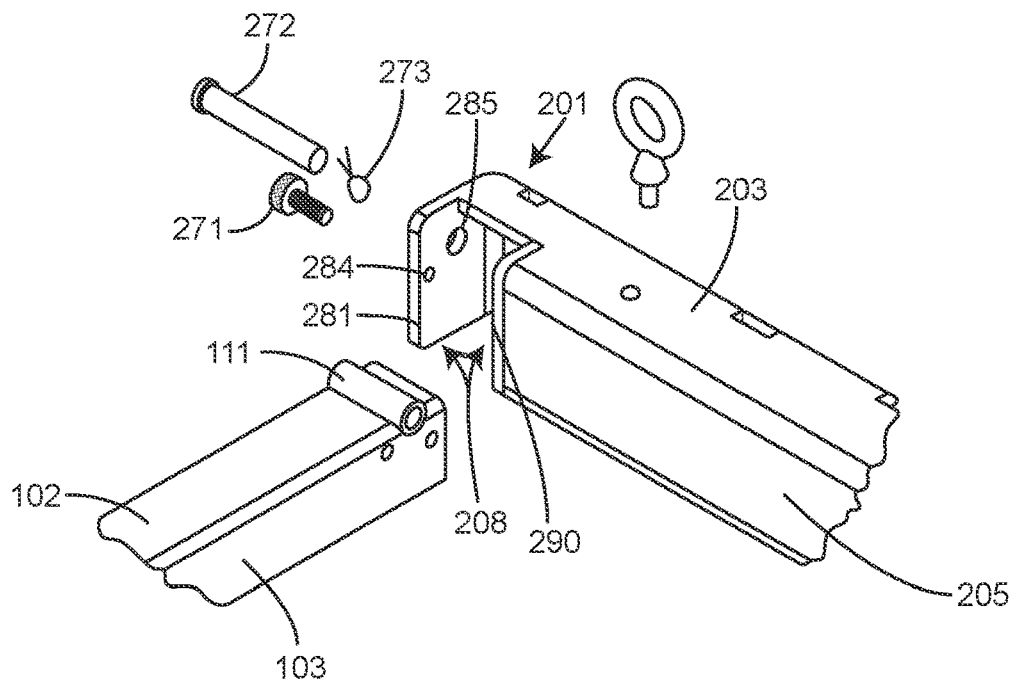
FIG. 6 illustrates an exemplary exploded view of the coupling mechanism in accordance with an embodiment of the present disclosure.

FIG. 5 illustrates side view of the device 10 having the pair of arms 100 in the closed state. As shown in FIG. 5, the pair of arms 100, in the closed state, makes an angle α with respect to a line parallel to the ground. In some embodiments, the pair of arms 100 are perpendicular to the ground, and hence, the angle α is 90 degrees. In other embodiments, the pair of arms 100 are substantially perpendicular to the ground making an obtuse angle with respect to the ground. In such embodiments, the angel α is more than 90 degrees, and more particularly, 93 degrees.

Figure 7:
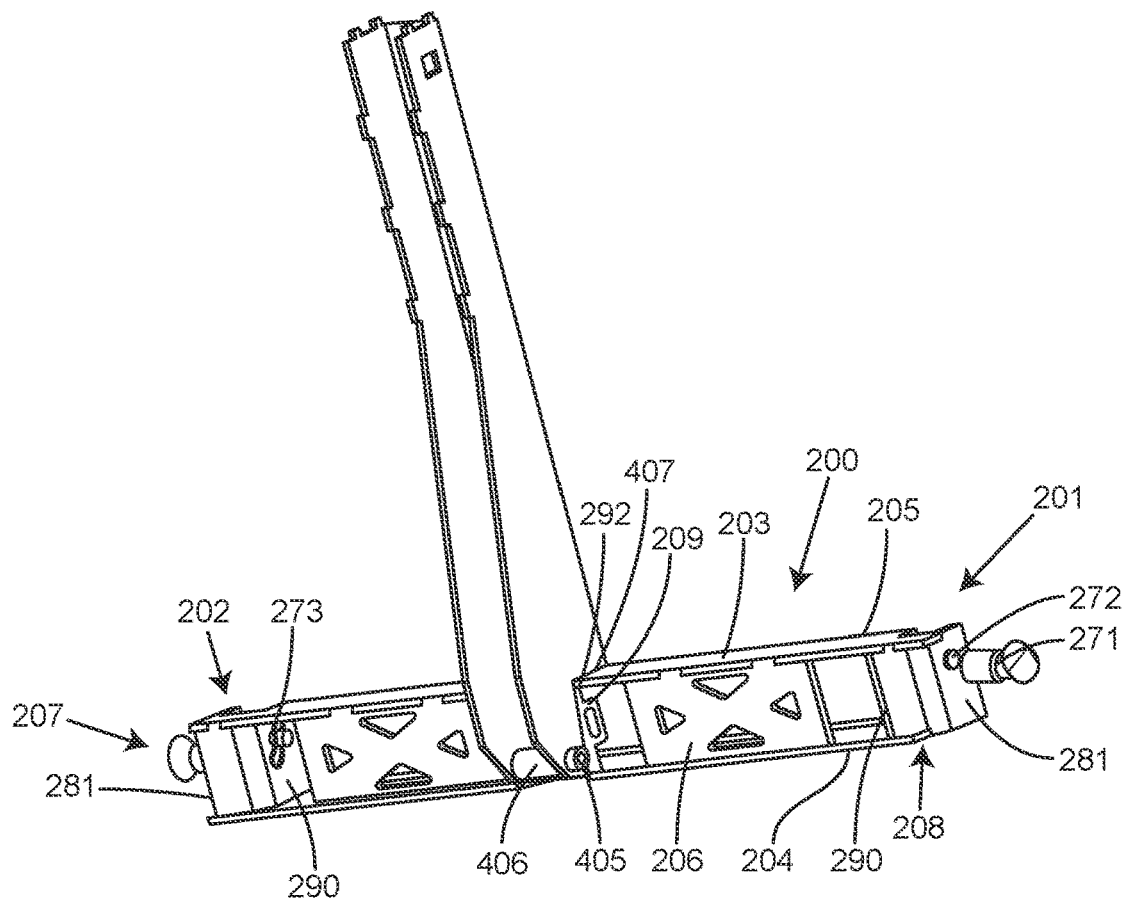
FIG. 7 illustrates an exemplary rear perspective view of a horizontal bar of a device in accordance with an embodiment of the present disclosure.

Referring to FIG. 7, an exemplary horizontal bar 200 is illustrated. The horizontal bar 200 comprises a top wall 203, a bottom wall 204, and a front wall 205. In some embodiments, the top wall 203, the bottom wall 204, and the front wall 205 are substantially straight and are configured to extend between the proximal portion 201 to the distal portion 202 of the horizontal bar 200. In some embodiments, a back portion of the horizontal bar 200 is uncovered. In other embodiments, a plurality of supports 206 may be disposed between the top wall 203 and the bottom wall 204 of the horizontal bar 200 to provide stability.

Figure 8:
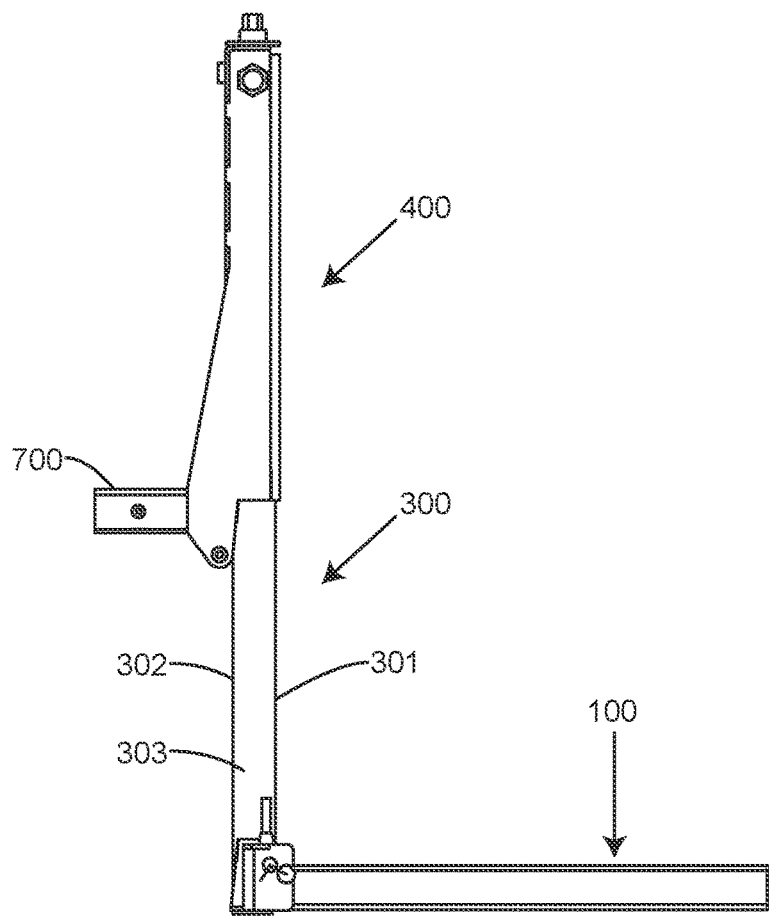
FIG. 8 illustrates an exemplary slide bar in accordance with an embodiment of the present disclosure.

The device 10 further comprises a slide bar 300 attached to the horizontal bar 200. An exemplary slide bar 300 in accordance with the present disclosure is illustrated in FIG. 8. The slide bar 300 is configured to be in an elongated state and a retracted state. The slide bar 300 comprises a front surface 301, a back surface 302, and a plurality of side surfaces 303 attached in a way so as to form a rectangular cross-section. In an embodiment, the slide bar 300 is a hollow structure. The slide bar 300 is configured to be attached to the horizontal bar 200. In a preferred embodiment, the slide bar 300 is attached to the horizontal bar 200 at a substantially middle portion of the horizontal bar 200. Such attachment facilitates substantially equal distribution of weight of the objects at both sides of the horizontal bar 200. In an embodiment, the slide bar 300 is attached to the horizontal bar 200 by means of welding. Any other method for attaching the slide bar 300 with the horizontal bar 200 known in the art may be used.

Figure 9:
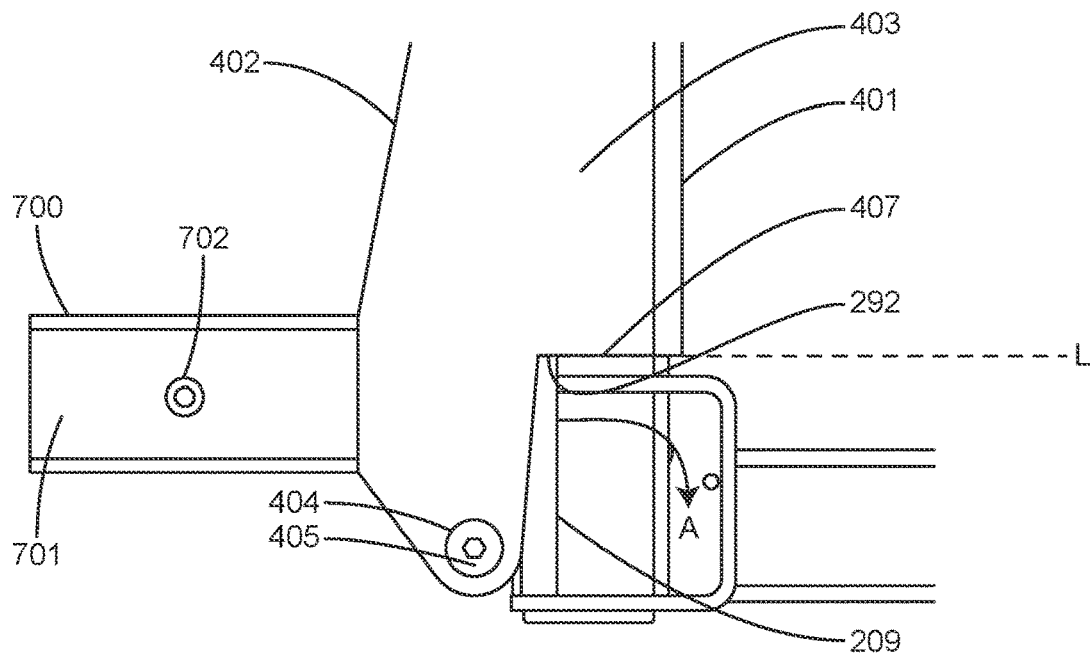
FIG. 9 illustrates an exemplary wedge in accordance with an embodiment of the present disclosure.

Referring back to FIG. 1, the device 10 further comprises a housing 400 configured to enclose the slide bar 300 therewithin. In an embodiment as seen in FIG. 9, the housing 400 is hollow, and comprises a front wall 401, a back wall 402, and a plurality of side walls 403. A dimension of the housing 400 corresponds to that of the slide bar 300. The housing 400 is configured to displace the slide bar 300 in the vertical direction. Accordingly, the slide bar 300 is configured to change states with respect to the housing 400.

Figure 10:
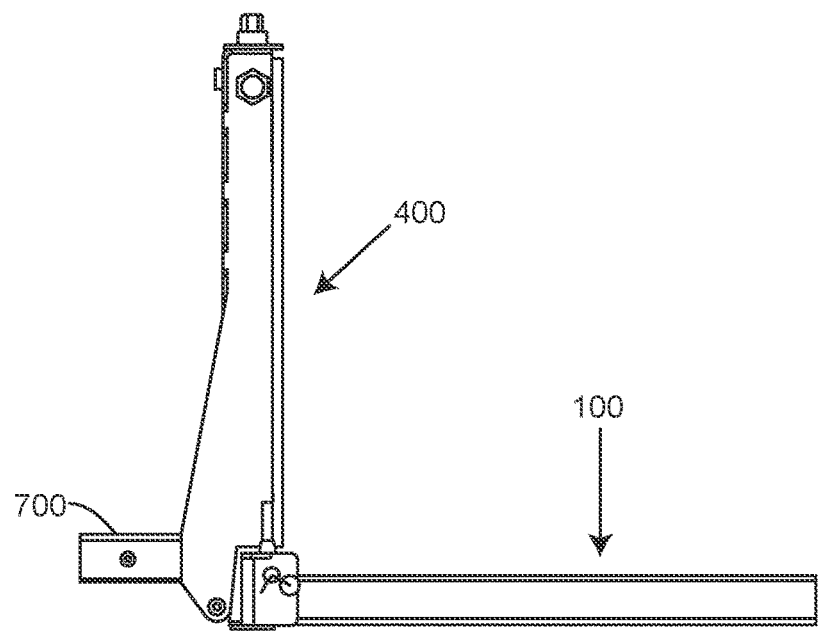
FIG. 10 illustrates an exemplary slide bar in a retracted state in accordance with an embodiment of the present disclosure.
Figure 11:
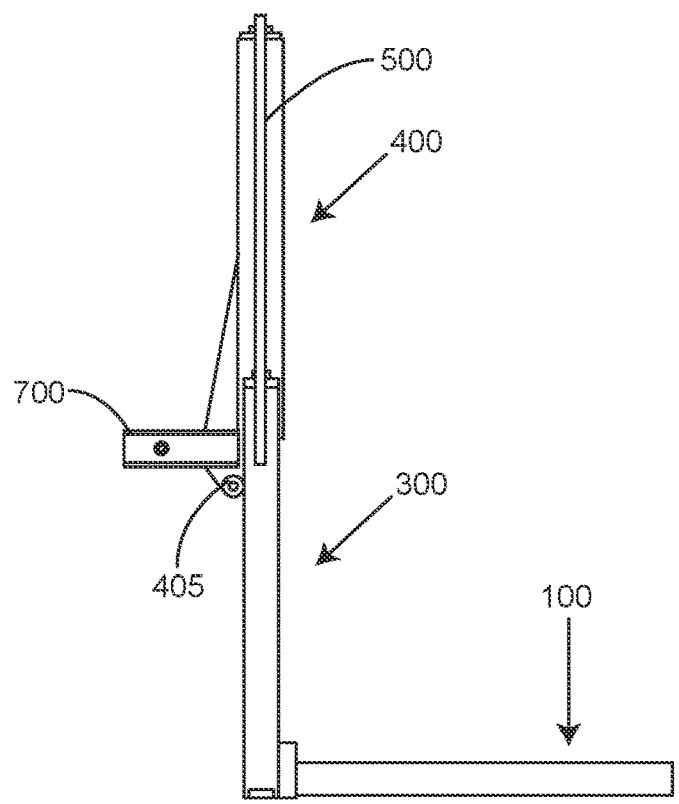
FIG. 11 illustrates an exemplary slide bar in an elongated state in accordance with an embodiment of the present disclosure.

The slide bar 300 is configured to be in the retracted state when it is at least substantially housed within the housing 400 and in the elongated state when it is at least substantially displaced out of the housing 400. With the displacement of the slide bar 300, the horizontal bar 200, and hence, the pair of arms 100 displace along with the slide bar 300. In the elongated state of the slide bar 300, the pair of arms 100 are configured to be closest to the ground. Hence, in a preferred embodiment, the elongated state of the slide bar 300 is used for loading an object on the pair of arms 100. Similarly, the elongated state is further used for unloading an object. In an exemplary embodiment, a total height of the device 10 when the slide bar 300 is in the retracted state is around 26 inches. FIG. 10 illustrates the slide bar 300 at least substantially housed in the housing 400, and hence, in the retracted state. FIG. 11 illustrates the slide bar 300 in the elongated state. In the elongated state, the total height of the device 10 when the slide bar 300 is around 42 inches. Hence, from the retracted state to the elongated state, the height of the device 10 is increased by approximately 16 inches. Thus, the device 10 may be used to lift an object having varying height till 42 inches. In an embodiment, an outer diameter of the device 10 is 33 inches.

Referring back to FIG. 7, the housing 400 comprises a smoothening structure at a proximal end thereof to provide smooth and minimal friction (friction less) displacement of the slide bar 300 with respect to the housing 400. For instance, the smoothening structure may comprise a shoulder screw 405 and a roller 406. The shoulder screw 405 is passed through a through provision 404 (best seen in FIG. 9) on the plurality of side walls 403 of the housing 400. The roller 406 is configured to be placed over the shoulder screw 405. The roller 406 is placed such that during displacement of the slide bar 300, the roller 406 comes in contact with the back surface 302 of the slide bar 300. In the elongated state, when an object is placed over the pair of arms 100, a large amount of weighing force is levied by the weight of the object at a point where the slide bar 300 is attached to the horizontal bar 200. At this stage, an energy required for the displacement of the slide bar 300 into the retracted state is very high. However, due to the placement of the roller 406, a rolling force is applied while displacing, which reduces (lessens) the friction at the time of displacement, and hence, the energy required for such displacement is significantly less as compared to the energy required in absence of the roller 406. This results in smooth displacement of the slide bar 300 even with an object having significant weight.

Referring to FIG. 9, the device 10 further comprises a wedge 209 on an inner surface of the bottom wall 204 of the horizontal bar 200 adjacent to each of the side surfaces 303 of the slide bar 300. The wedge 209 is of a predefined height. In an embodiment, in the retracted state of the slide bar 300, the roller 406 is configured to be placed adjacent to the wedge 209. While displacing the slide bar 300 into the retracted state, at a predefined level L, a lower edge 407 of the housing 400 coincides with an upper edge 292 of the wedge 209 at each of the side walls 403 of the housing 400, which restricts further movement of the slide bar 300 from the predefined level L. At this stage when the lower edge 407 of the housing 400 coincides with the upper edge 292 of the wedge 209, the retracted state is achieved. Hence, the wedge 209 works as an obstacle for displacement of the slide bar 300 beyond the predefined level L and the slide bar 300 is not able to displace further. The further displacement of the slide bar 300 results in a pushing force on the wedge 209. This action bends the wedge 209 to a certain angle such that the wedge 209 makes an acute angle with the bottom wall 204 of the horizontal bar 200 and with the ground, resulting in a very large binding force between the slide bar 300 and the horizontal bar 200. Hence, the wedge 209 provides stability to the device 10. FIG. 9 illustrates the pushing forward action indicated by an arrow A. The bended wedge 209 provides secure locking of the slide bar 300 in the retracted state to prevent rattles during transit of the object using the device 10.

Figure 12:
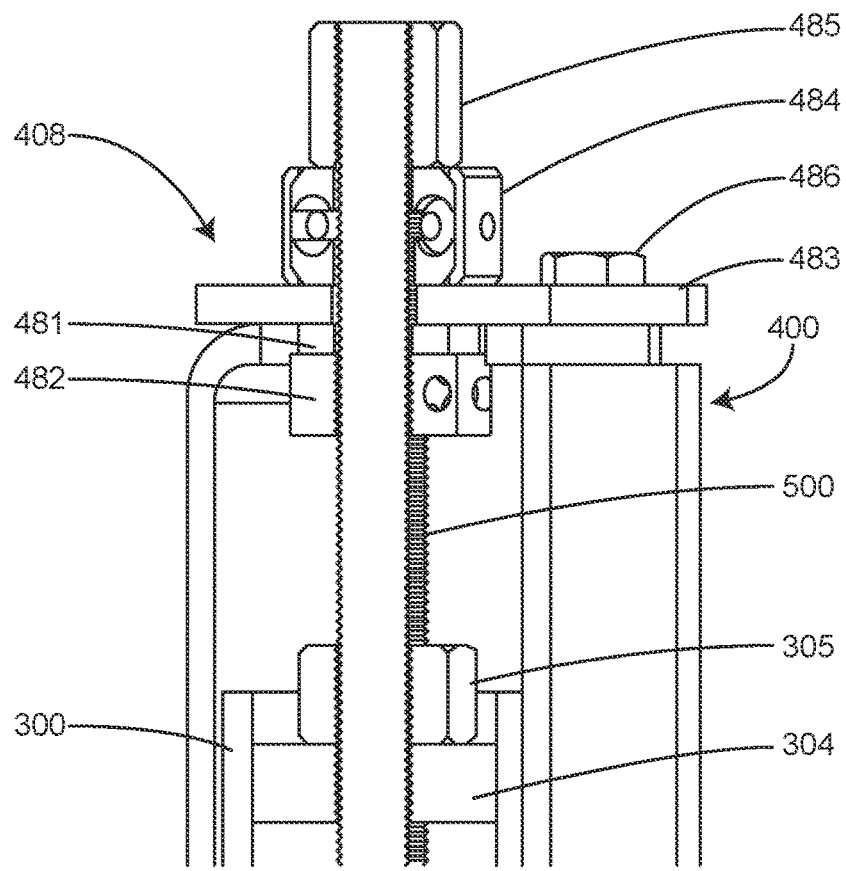
FIG. 12 illustrates an exemplary threaded rod and an internal structure of a housing in accordance with an embodiment of the present disclosure.

Referring to FIG. 12, and also shown in FIG. 11, the device 10 comprises a threaded rod 500 configured to pass within the slide bar 300 and the housing 400. The threaded rod 500 is configured to be rotated in the clockwise direction and the anticlockwise direction. The rotation of the threaded rod 500 results in displacement of the slide bar 300 with respect to the housing 400. In an embodiment, threads of the threaded rod 500 are acme threads. The acme threads facilitate the threaded rod 500 to rotate smoothly and with less energy, which makes the displacement of the slide bar 300 smooth and easy. In the elongated state, the threaded rod 500 is configured to be housed within the housing 400 and partially in the slide bar 300. In the retracted state, the threaded rod 500 is configured to be housed within the housing 400 and at least substantially within the slide bar 300. The threaded rod 500 is attached with the slide bar 300 by means of a coupling plate 304 and a nut 305 coupled to an upper surface of the coupling plate 304. The coupling plate 304 and the nut 305 may be attached by any suitable method known in the art. In an embodiment, the threaded rod 500 is passed through the nut 305 and the coupling plate 304 at the time of assembling the device 10.

Figure 13:
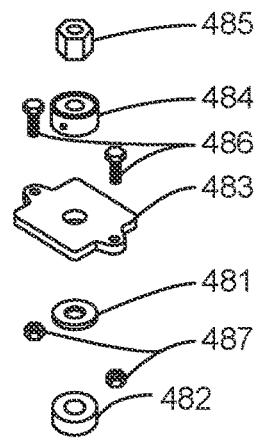
FIG. 13 illustrates an exemplary exploded view of a threaded rod arrangement for the threaded rod of FIG. 12.
Figure 13:
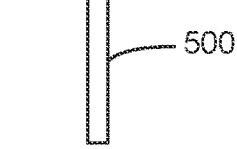

For providing the displacement of the slide bar 300, the housing 400 comprises a threaded rod arrangement 408. The threaded rod arrangement 408 is configured to couple the threaded rod 500 with a distal end of the housing 400. For the threaded rod 500 to be housed within the housing 400, for instance, the threaded rod arrangement 408 may comprise a threaded shaft collar 481, a thrust plain bearing 482, a top lifting plate 483, a thrust ball bearing 484, and a hex nut 485. FIG. 12 illustrates an exemplary threaded rod arrangement 408 and an internal structure of the distal end of the housing 400 in association with the slide bar 300 while FIG. 13 illustrates an exploded view of the threaded rod arrangement 408. The hex nut 485 is configured to be placed at a distal end of the threaded rod 500. The thrust ball bearing 484, and the thrust plain bearing 482 are configured to provide smooth rotation of the threaded rod 500, and hence, smooth displacement to the slide bar 300. For the attachment of the threaded rod 500 with the housing 400, the top lifting plate 483 is provided, which is attached to a distal end of the housing 400 using a plurality of screws 486 and nuts 487.

FIG. 14-18 illustrate an exemplary locking mechanism 409 of the housing 400 in accordance with the present disclosure. The locking mechanism 409 is configured to lock the slide bar 300 with the housing 400 in the retracted state to provide stability and to lessen effects of any rattle while carrying an object in the open state, and when the device 10 is not being used, in the closed state. The locking mechanism 409 comprises a latch bolt 491, a spring 492, a latch link rod 493, a latch ferrule 494, and a ball knob 495. The locking mechanism 409 further comprises a lock latch 496 and a cam lock 497 (seen in FIGS. 18-19). The latch bolt 491 comprises a groove at a distal end for accommodating a protrusion of the lock latch 496 therewithin.

Figure 14:
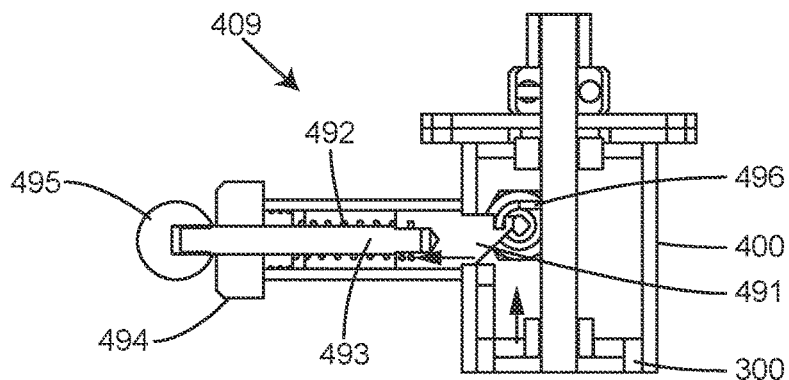
FIGS. 14-FIG. 18 illustrate an exemplary locking mechanism in accordance with an embodiment of the present disclosure.
Figure 15:
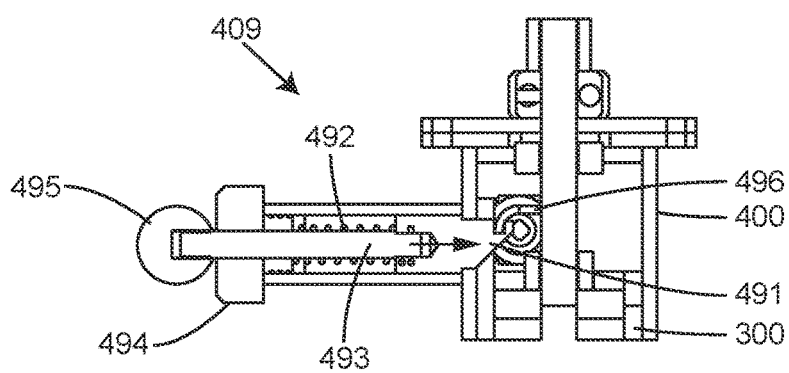
Figure 16:
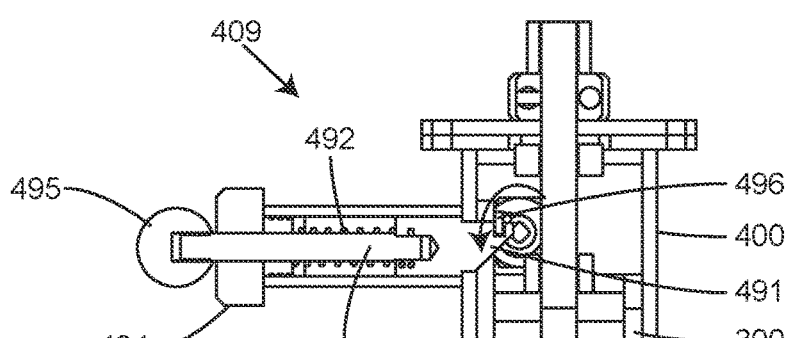
Figure 17:
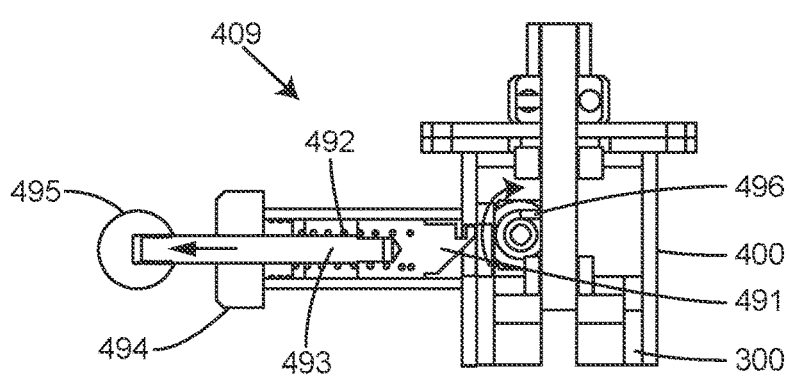
Figure 18:
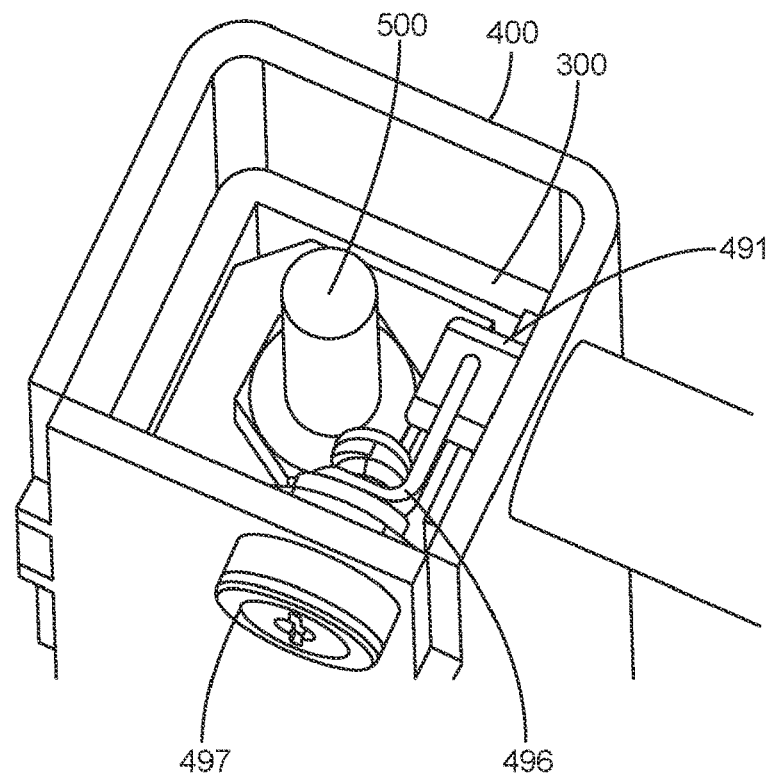
Figure 19:
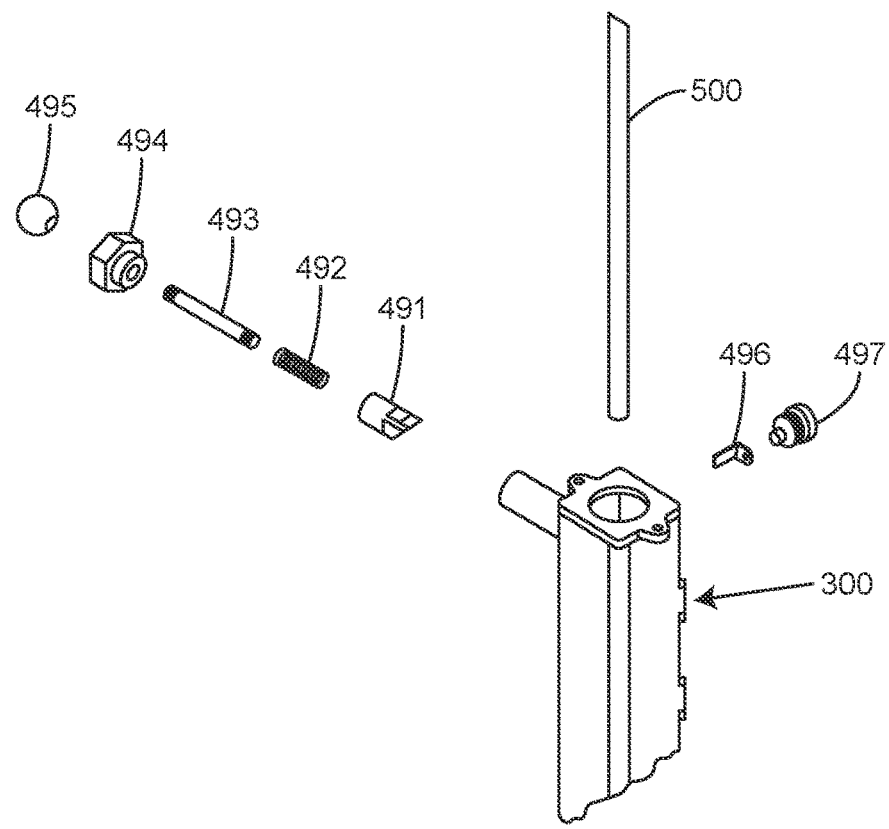
FIG. 19 illustrates an exemplary exploded view of the locking mechanism of FIG. 14-FIG. 18.

FIG. 14 illustrates an exemplary state when the slide bar 300 is displaced to the retracted state. To lock the slide bar 300, the ball knob 495 is pulled as indicated by an outward arrow, thereby retracting the spring 492, and the threaded rod 500 is rotated. The rotation of the threaded rod 500 displaces the slide bar 300 towards the distal end of the housing 400 as indicated by an upward arrow. When the slide bar 300 reaches at the predefined distance from the distal end of the housing 400, the ball knob 495 is released, thereby releasing the spring 492. Hence, the ball knob 495 reaches at a desired position due to the release of the spring 492 as indicated by an inward arrow for locking the slide bar 300, as illustrated in FIG. 15. The lock latch 496 is then rotated in a first direction, indicated by a rotating arrow, by rotating the cam lock 497 with a key. This rotation of the cam lock 497 results in rotation of the protrusion of the lock latch 496 and in engagement of the lock latch 496 to the groove of the latch bolt 491. This configuration, as illustrated in FIG. 16, locks the slide bar 300 in the retracted state. When the device 10 is carrying an object and the slide bar 300 is in the retracted state, the locking mechanism 409 holds the slide bar 300 in the retracted state, thereby preventing accidental pulling out of the slide bar 300 in transit. For unlocking and displacement of the slide bar 300, the lock latch 496 is rotated in a second direction as indicated by a second rotating arrow in FIG. 17, opposite to the first direction, and the ball knob 495 is pulled in an outward direction, indicated by an outward arrow. This configuration releases the slide bar 300 and facilitates displacement of the slide bar 300 by rotating the threaded rod 500. FIG. 18 illustrates a top perspective view of the locking mechanism 409 wherein the slide bar 300 is locked with the housing 400. The locking mechanism 409 thus locks the slide bar 300. FIG. 19 illustrates an exploded view of the locking mechanism 409 illustrating the various components in accordance with the present disclosure.

The rotation of the threaded rod 500 is controlled by rotating the hex nut 485 at the distal end of the housing 400. The rotation of the threaded rod 500 may be performed manually, automatically, or semi-automatically. In embodiment as seen in FIGS. 1-19, the hex nut 485 may be removably attached to an electric actuator such that the threaded rod 500 is configured to be rotated using an electric actuator. The electric actuator can include but not limited to: handheld drill motor (not shown in figures). Thus, the rotation of the threaded rod 500 may be performed using the electric actuator in semi-automatic fashion.

In some embodiments, the threaded rod 500 is rotated manually by attaching a wrench to the hex nut 485. Accordingly, the operation of the device 10 is very simple. No internal motor, energy source for the battery, or no jack is needed for the displacement. Thus, the design of the device 10 is very simple. Thus, the rotation of the threaded rod 500 may be performed manually.

In yet other embodiments, the rotation of the threaded rod 500 is controlled by attaching a handheld drill motor (not shown in figures) to the hex nut 485. Hence, the displacement of the slide bar 300 from the retracted state to the elongated state and vice versa, is achieved by simply actuating the handheld drill motor (not shown in figures) attached to the hex nut 485. Further, the operation of the device 10 is also very easy, which makes the device 10 easy to use by any person as no extra skill is needed to use the device 10.

Referring back to FIG. 1, the device 10 further comprises a plurality of strap points to attach a securing mechanism for securing objects with the device 10. For instance, an eye bolt 600 may be attached to each of the strap points to facilitate attachment of an object with the device 10 using a plurality of strap bands to secure tie and to restrict movement of the object while transiting the object from one place to another. In an exemplary embodiment, the strap points may be provided on the top wall 203 of the horizontal bar 200. The strap points may be provided at other suitable location as per requirement.

In some embodiments, the device 10 further comprises a second locking mechanism at a preferred location on the housing 400 for displacement of the slide bar 300 to a certain height. In such embodiment, the slide bar 300 may be in a semi-elongated state. This configuration may be used to adjust the total height of the device 10 with respect to a certain height of the object. The height adjustment may result in better lifting and support of the object while in transit.

The device 10 is configured to carry objects having different weights. The device 10, for instance, is configured to carry an object having weight up to 1000 lbs. Some non-limiting examples of the objects carried by the device 10 are heavy luggage, a toolbox, a bike, a pallet, a wheelchair, a camping gear, a hunting gear and the like.

For attachment of the device 10 with a hitch receiver of the vehicle, the device 10 comprises an insert 700 (seen in FIG. 1) configured to be inserted into a standard hitch receiver. Generally, the insert 700 is of a rectangular cross-section, and is configured to be inserted and engaged with the hitch receiver at the rear of a vehicle. The insert 700 comprises a pair of walls 701 configured to be placed opposite to each other. In some embodiments, the insert 700 is configured to be placed at the distal end of the housing 400 and adjacent to the screw and the roller 406, as seen in FIG. 9. The insert 700 may be attached to the housing 400 by way of welding. Any other conventional methods for attaching the insert 700 with the housing 400 may also be used.

The insert 700 is configured to be engaged to the hitch receiver of all types of vehicles, such as an SUV, a hatchback car, a minibus, a truck, and the like. To be engaged with the hitch receiver, a first pair of walls 701 comprises engagement means 702. The insert 700 is inserted into the hitch receiver such that the engagement means of the insert 700 is aligned with corresponding engagement means in the hitch receiver. In some embodiments, the engagement means 702 of the insert 700 is an aperture and the engagement means of the vehicle is a bolt, the aperture configured to receive the bolt to engage the insert, and thus, the device 10, to the hitch receiver of the vehicle.

In some embodiments, at least some of the components of the device 10 are formed using steel. In some embodiments, all of the components of the device 10 are formed using steel.

Figure 20:
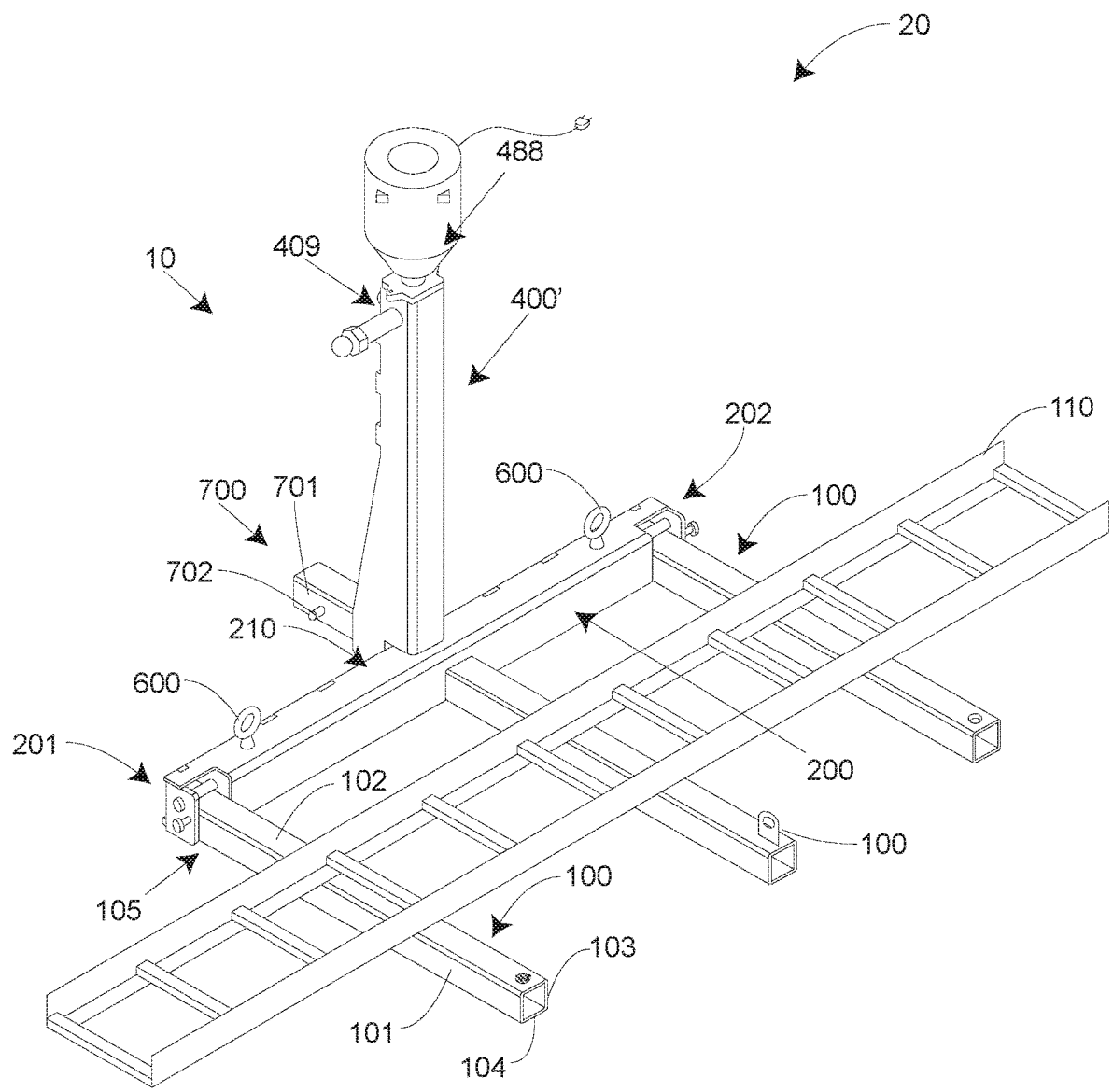
FIG. 20 illustrates a perspective view of a device for lifting objects according to yet another embodiment of the present disclosure.

FIG. 20 illustrates a perspective view of a device 20 for lifting objects according to yet another embodiment of the present disclosure. The device 20 is similar to device 10 (FIGS. 1-19) except modifications associated with the housing as well as addition of an intermediate arm 100 between pair of arms 100. The device 20 comprises three arms 100, that is, one intermediate arm 100 in addition to pair of arms 100 of FIG. 1, to provide support to objects and for lifting the objects. Further, the device 20 further comprises a support structure 110 connected to each arm 100. As shown in FIG. 20, the support structure 110 is substantially ladder-shaped to support weight (load) of objects. The term 'objects' as used in the present disclosure is intended to items that are to be lifted and carried, such as heavy luggage, a toolbox, a bike, a pallet, a wheelchair, a camping gear, a hunting gear, and the like.

The device 20 comprises a horizontal bar 200, similar to a horizontal bar 200 of FIG. 1, comprising a proximal portion 201 and a distal portion 202. Each of the three arms 100 is configured to be coupled with the horizontal bar 200, in that, one arm of the three arms 100 is configured to be coupled to the proximal portion 201 of the horizontal bar 200, intermediate arm of the three arms 100 is configured to be coupled to the intermediate portion 210 of the horizontal bar 200, and the remaining arm of the three arms 100 is configured to be coupled to the distal portion 202 of the horizontal bar 200. Each of the three arms 100 comprises a distal end 105 at which the arms are coupled to the horizontal bar 200. In the illustrated embodiment as shown in FIG. 20, for coupling of the arms and the horizontal bar 200, two arms of the three arms 100 coupled to extremities of the horizontal bar 200, that is the proximal portion 201 and the distal portion 202, comprises a hollow passage, similar as described earlier in reference to FIG. 6. In the illustrated embodiment as shown in FIG. 20, the intermediate arm 100 is fixedly coupled to the intermediate portion 210 of the horizontal bar 200.

Further, in an exemplary embodiment (not shown in figures), for coupling of the arms and the horizontal bar 200, each of the three arms 100 comprises a hollow passage, similar as described earlier in reference to FIG. 6. Each of the three arms 100 are configured to shift between an open state and a closed state. The open state of the three arms 100 is a state in which the three arms 100 are placed substantially parallel to the ground and are configured to carry an object thereon, for instance, as illustrated in FIG. 20. In other words, the device 20 is configured to support an object placed on the three arms 100, and further, lift the object placed on the three arms 100 when the three arms 100 are in the open state. In the closed state (not shown in figures), the three arms 100 are substantially perpendicular to the ground. In other words, when the device 20 is not being used to lift an object, the three arms 100 are configured to be in the closed state. The transition of each of the three arms 100 between the open state and the closed state is achieved by a coupling mechanism 207, similar as described earlier in reference to FIGS. 2-6. The device 20 comprises a coupling mechanism 207 at proximal portion 201, intermediate portion 210 and the distal portion 202 of the horizontal bar 200 to attach the three arms 100. In some embodiments, each of the three arms 100 is configured to be in an individual open state and an individual closed state and is configured to shift between the states using the corresponding coupling mechanism.

Figure 23:
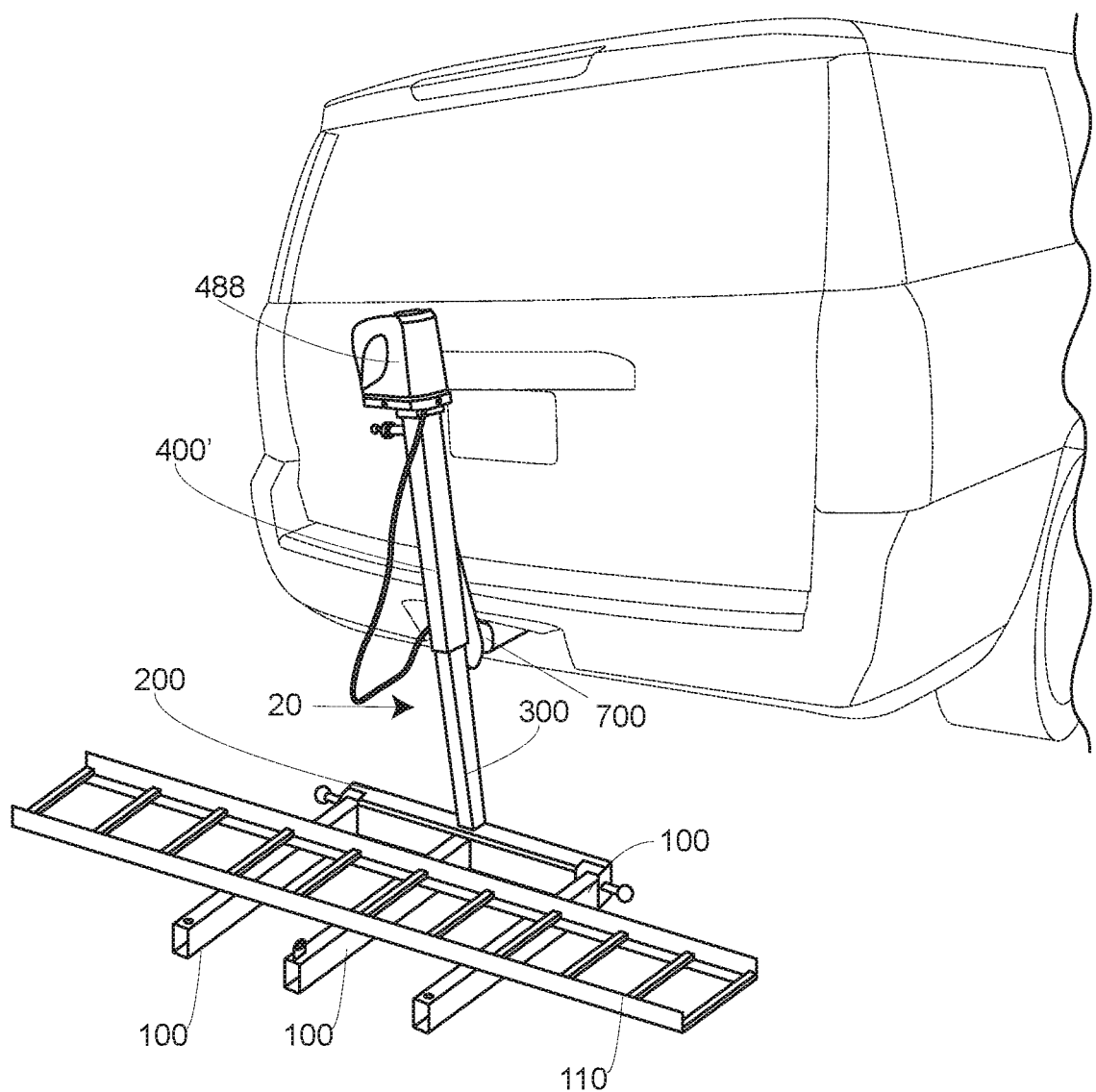
FIG. 23 illustrates a perspective view of the device of FIG. 20 connected to a motor vehicle; wherein the slide bar is positioned in an elongated state.

In an exemplary embodiment as seen in FIG. 23, the device 20 further comprises a slide bar 300, similar to a slide bar 300 of FIG. 8, attached to the horizontal bar 200. The slide bar 300 is configured to be in an elongated state and a retracted state.

The device 20 further comprises a housing 400' configured to enclose the slide bar 300 therewithin. The housing 400' is similar to housing 400 of FIG. 1, except modifications associated with threaded rod arrangement 408', which will be described in below description. The housing 400' is configured to displace a slide bar 300, similar to slide bar 300 of FIG. 8, in the vertical direction. Accordingly, the slide bar 300 is configured to change states with respect to the housing 400'.

Figure 21:
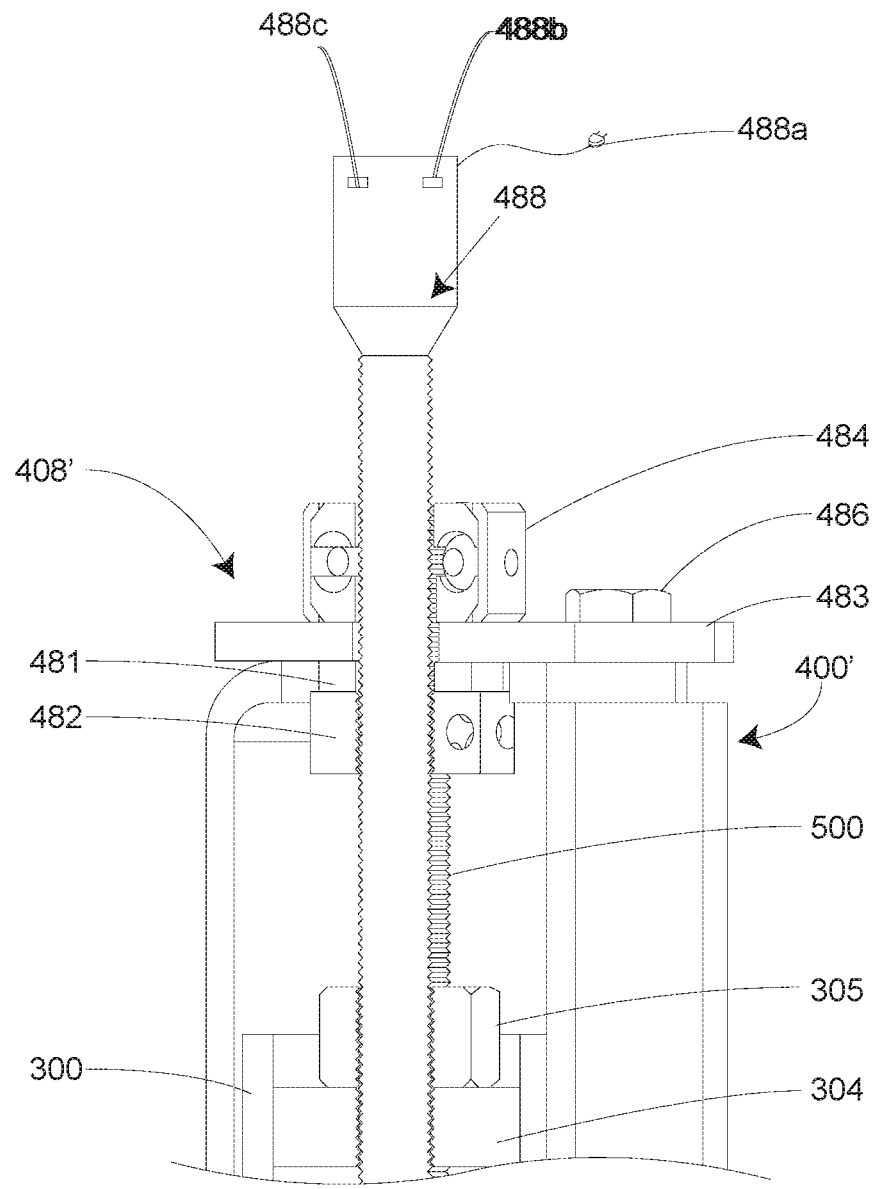
FIG. 21 illustrates an exemplary threaded rod and an internal structure of a housing in accordance with another embodiment of the present disclosure.
Figure 24:
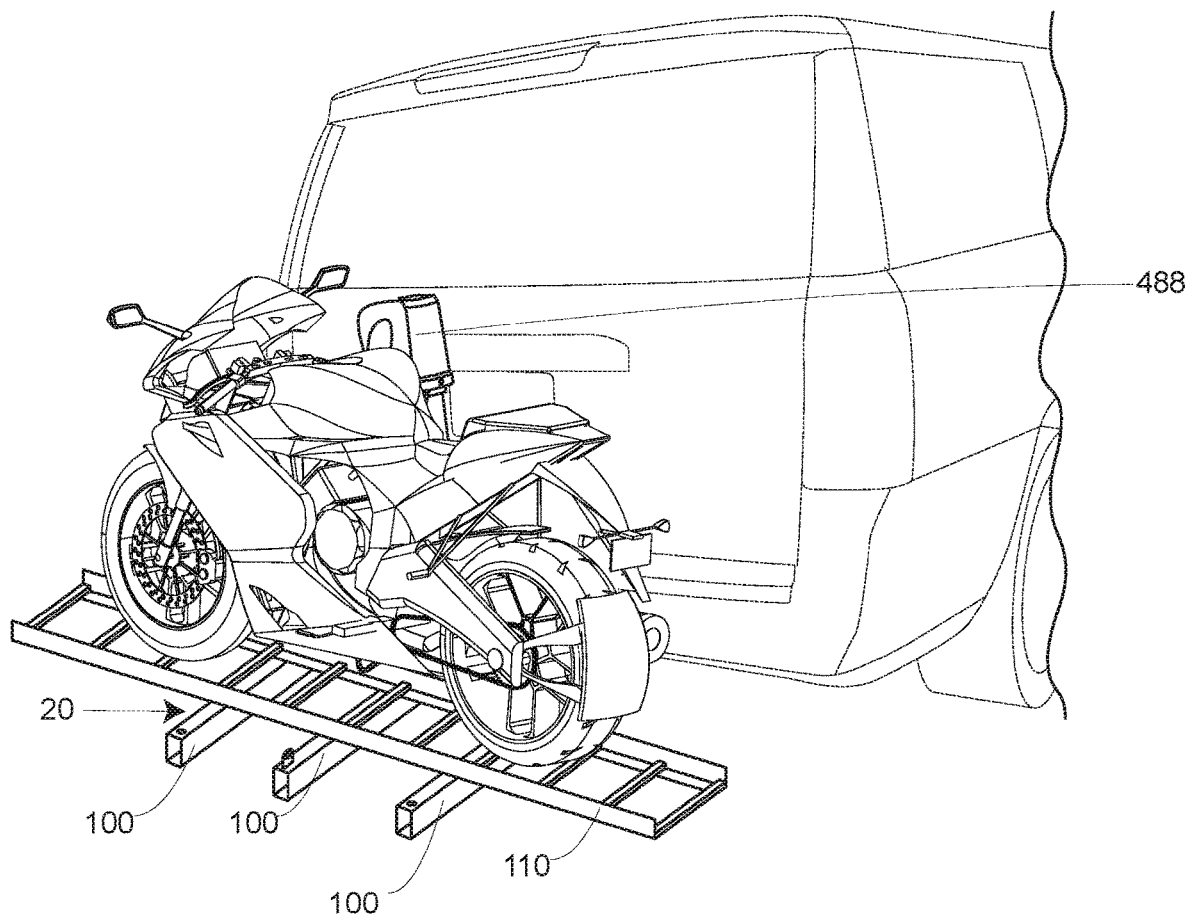
FIG. 24 illustrates a perspective view of the device of FIG. 20 connected to a motor vehicle; wherein the slide bar is positioned in a retracted state, and the device is carrying a motorcycle.

Referring to FIG. 21, the device 20 comprises a threaded rod 500 configured to pass within the slide bar 300 and a housing 400'. The threaded rod 500 is configured to be rotated in the clockwise direction and the anticlockwise direction. The rotation of the threaded rod 500 results in displacement of the slide bar 300 with respect to the housing 400'. In an embodiment, threads of the threaded rod 500 are acme threads. The acme threads facilitate the threaded rod 500 to rotate smoothly and with less energy, which makes the displacement of the slide bar 300 smooth and easy. In the elongated state, the threaded rod 500 is configured to be housed within the housing 400' and partially in the slide bar 300 as seen in FIG. 23. In the retracted state, the threaded rod 500 is configured to be housed within the housing 400' and at least substantially within the slide bar 300 as seen in FIG. 24. The threaded rod 500 is attached with the slide bar 300 by means of a coupling plate 304 and a nut 305 coupled to an upper surface of the coupling plate 304. The coupling plate 304 and the nut 305 may be attached by any suitable method known in the art. In an embodiment, the threaded rod 500 is passed through the nut 305 and the coupling plate 304 at the time of assembling the device 10.

For providing the displacement of the slide bar 300, the housing 400' comprises a threaded rod arrangement 408'. The threaded rod arrangement 408' is similar to threaded rod arrangement 408 (FIGS. 12-13) except the elimination of hex nut 485 and addition of an electric motor 488 instead of hex nut 485. The threaded rod arrangement 408' is configured to couple the threaded rod 500 with a distal end of the housing 400'. For the threaded rod 500 to be housed within the housing 400', for instance, the threaded rod arrangement 408' may comprise a threaded shaft collar 481, a thrust plain bearing 482, a top lifting plate 483, a thrust ball bearing 484, and an electric motor 488.

Figure 22:
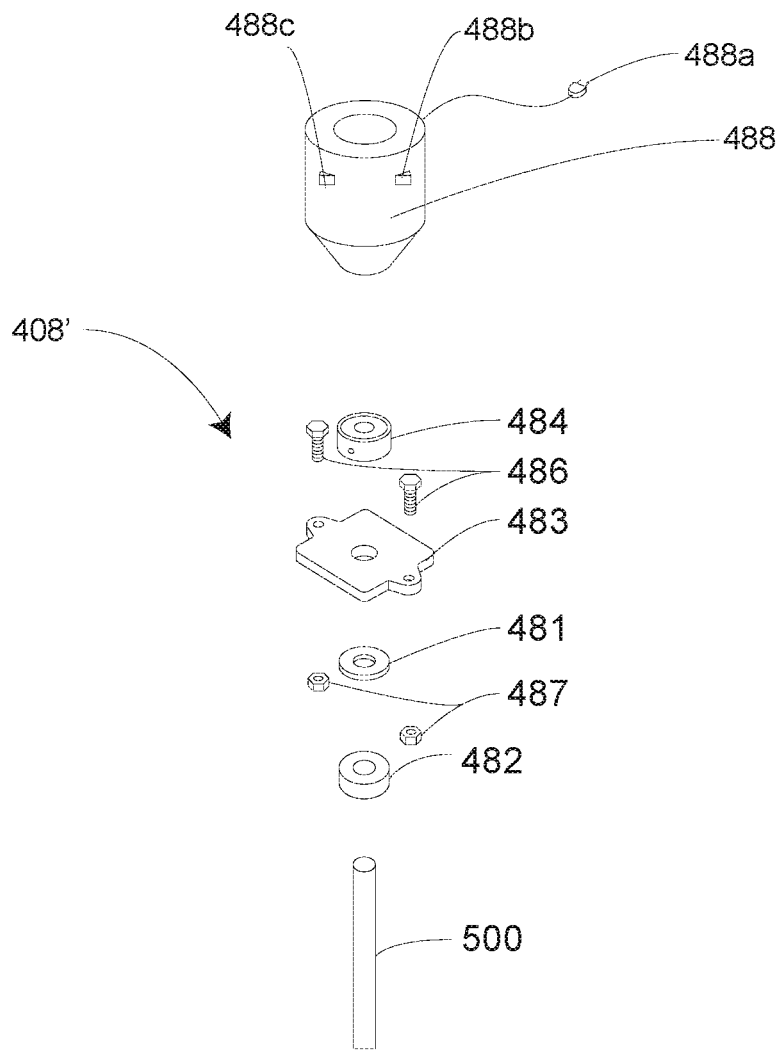
FIG. 22 illustrates an exemplary exploded view of a threaded rod arrangement for the threaded rod of FIG. 21.

FIG. 21 illustrates an exemplary threaded rod arrangement 408' and an internal structure of the distal end of the housing 400' in association with the slide bar 300 while FIG. 22 illustrates an exploded view of the threaded rod arrangement 408'. The electric motor 488 is configured to be arranged at a distal end of the threaded rod 500 such that a drive shaft (not shown in figures) of the electric motor 488 is rotationally coupled to the distal end of the threaded rod 500. The thrust ball bearing 484, and the thrust plain bearing 482 are configured to provide smooth rotation of the threaded rod 500, and hence, smooth displacement to the slide bar 300. For the attachment of the threaded rod 500 with the housing 400', the top lifting plate 483 is provided, which is attached to a distal end of the housing 400' using a plurality of screws 486 and nuts 487.

The rotation of the threaded rod 500 is controlled by actuating the electric motor 488 at the distal end of the housing 400'. In an embodiment as seen in FIGS. 20-24, the threaded rod 500 is configured to be rotated using an electric actuator wherein the electric actuator is an electric motor 488. In an exemplary embodiment, the electric motor 488 could be integrally connected (built-in) to the housing 400'. In another exemplary embodiment, the electric motor 488 could be retro-fittingly mounted (later installed) to the housing 400'. The electric motor 488 further comprises an electric connector 488a such as but not limited to wires, plugs, sockets and combinations thereof. The electric connector 488a is configured to electrically connect the electric motor 488 with an electrical power source (not shown in figures). In various embodiments, the electrical power source (not shown in figures) could include but not limited to: vehicle tail lights, vehicle cigarette plug (in-car electric socket), vehicle battery, vehicle power outlet, power cables, power sockets available in various premises such as homes, offices, factory and so on. In an exemplary embodiment, the electrical power source (not shown in figures) is retro-fittingly electrically connected to the electric motor 488 by a vehicle technician. The actuation of the electric motor 488 is controlled by a pair of switches, designated as an uplift switch 488b and a downlift switch 488c. When the uplift switch 488b is manually pressed, then the electric motor 488 is rotated in a specific direction to bring the slide bar 300 in the retracted state as shown in FIG. 24. When the downlift switch 488c is manually pressed, then the electric motor 488 is rotated in the opposite direction to bring the slide bar 300 in the elongated state as shown in FIG. 23. Hence, the displacement of the slide bar 300 from the retracted state to the elongated state and vice versa, is achieved automatically by simply actuating the electric motor 488. Accordingly, the operation of the device 20 is very simple. Further, the operation of the device 20 is also very easy, which makes the device 20 easy to use by any person as no extra skill is needed to use the device 20.

FIG. 23 illustrates a perspective view of the device 20 (FIG. 20) wherein the device 20 is connected to a motor vehicle. For attachment of the device 20 with a hitch receiver of the vehicle, the device 20 comprises an insert 700 (seen in FIG. 20) configured to be inserted into a standard hitch receiver of a motor vehicle. The slide bar 300, similar to slide bar 300 of FIG. 8, is configured to be in the retracted state when it is at least substantially housed within the housing 400' and in the elongated state when it is at least substantially displaced out of the housing 400'. With the displacement of the slide bar 300, the horizontal bar 200, and hence, the three arms 100 displace along with the slide bar 300. In the elongated state of the slide bar 300, the three arms 100 are configured to be closest to the ground. Hence, in a preferred embodiment, the elongated state of the slide bar 300 is used for loading an object on the three arms 100. Similarly, the elongated state is further used for unloading an object. In an exemplary embodiment, a total height of the device 20 when the slide bar 300 is in the retracted state is around 26 inches. FIG. 24 illustrates the slide bar 300 at least substantially housed in the housing 400', and hence, in the retracted state. Further, as seen in FIG. 24, the device 20 is carrying a motorcycle.

FIG. 23 illustrates the slide bar 300 in the elongated state. In the elongated state, the total height of the device 20 when the slide bar 300 is around 42 inches. Hence, from the retracted state to the elongated state, the height of the device 20 is increased by approximately 16 inches. Thus, the device 20 may be used to lift an object having varying height till 42 inches. In an embodiment, an outer diameter of the device 20 is 33 inches.

It should be well understood that the device 10 (FIGS. 1-19) and the device 20 (FIGS. 20-24) and their associated parts and components are very similar and could be interchangeably used. Thus, various embodiments associated with the device 10 (FIGS. 1-19) could also be used (applicable) in conjunction with the device 20 (FIGS. 20-24) and vice-versa.

Finally, while the present invention has been described above with reference to various exemplary embodiments, many changes, combinations, and modifications may be made to the exemplary embodiments without departing from the scope of the present invention. For example, the various components may be implemented in alternative ways. These alternatives can be suitably selected depending upon the particular application or in consideration of any number of factors associated with the operation of the device. In addition, the techniques described herein may be extended or modified for use with other types of devices. These and other changes or modifications are intended to be included within the scope of the present invention.

What is claimed is:

1. A device (10,20) for lifting one or more objects, the device comprising:
   at least a pair of arms (100) configured to receive one or more objects;
   a horizontal bar (200) coupled with the pair of arms (100);
   a slide bar (300) coupled with the horizontal bar (200), wherein the slide bar (300) is configured to be displaced with respect to a housing (400,400') between a retracted state and an elongated state;
   a threaded rod (500) configured to pass within the slide bar (300) and the housing (400, 400'); wherein the threaded rod (500) is configured to be rotated in the clockwise direction and the anticlockwise direction; and rotation of the threaded rod (500) displaces the slide bar (300) with respect to the housing (400,400');
   wherein the housing (400, 400') comprises a threaded rod arrangement (408, 408') configured to couple the threaded rod (500) with a distal end of the housing (400, 400');
   an insert (700) coupled with the housing (400,400'), wherein the insert (700) is configured to be engaged to a hitch receiver of a vehicle; and
   wherein the threaded rod arrangement (408, 408') comprises a threaded shaft collar (481), a thrust plain bearing (482), a top lifting plate (483), and a thrust ball bearing (484).

2. The device (10,20) according to claim 1, wherein the object comprises at least one of: a heavy luggage, a toolbox, a bike, a pallet, a wheelchair, a camping gear and a hunting gear.

3. The device (10,20) according to claim 1, wherein each of the pair of arms (100) are configured to shift between an open state and a closed state;
   wherein in the closed state, the pair of arms (100) are substantially perpendicular to the ground; and
   wherein in the open state, the pair of arms (100) are placed substantially parallel to the ground and the pair of arms (100) are configured to carry at least one object.

4. The device (10,20) according to claim 3, wherein transition of each of the pair of arms (100) between the open state and the closed state is achieved by a coupling mechanism (207), wherein coupling mechanism (207) is configured to couple the pair of arms (100) with the horizontal bar (200), and the coupling mechanism (207) comprises a spring plunger pin (271), a clevis pin (272) and a cotter pin (273).

5. The device (10,20) according to claim 1, wherein the device (10,20) further comprises a wedge (209) on an inner surface of a bottom wall (204) of the horizontal bar (200); wherein the wedge (209) limits the displacement of the slide bar (300) and further provides secure locking of the slide bar (300) in the retracted state to prevent rattles during transit of the object using the device (10, 20).

6. The device (10,20) according to claim 1, wherein the threaded rod arrangement (408) further comprises a hex nut (485), wherein the hex nut (485) is configured to be rotated to control rotation of the threaded rod (500).

7. The device (10,20) according to claim 1, wherein the threaded rod arrangement (408') further comprises an electric motor (488) configured to be actuated to control rotation of the threaded rod (500), wherein the electric motor (488) is rotationally coupled to the distal end of the threaded rod (500).

8. The device (10,20) according to claim 1, wherein the housing (400) comprises a locking mechanism (409) configured to lock the slide bar (300) with the housing (400) when the slide bar (300) is in retracted state, wherein the locking mechanism (409) comprises: a latch bolt (491), a spring (492), a latch link rod (493), a latch ferrule (494), a ball knob (495), a lock latch (496) and a cam lock (497).

9. The device (10,20) according to claim 1, wherein the housing (400,400') further comprises a smoothening structure that comprises a roller (406), wherein during displacement of the slide bar (300) with respect to the housing (400,400'), the roller (406) comes in contact with the slide bar (300); wherein the smoothening structure is configured to enable reduced-friction displacement of the slide bar (300) with respect to the housing (400,400').

10. The device (10,20) according to claim 1, wherein the slide bar (300) is configured to be in the retracted state when it is at least substantially housed within the housing (400); and the slide bar (300) is configured to be in the elongated state when it is at least substantially displaced out of the housing (400).

11. A device (10, 20) for lifting one or more objects, the device comprising:
   at least a pair of arms (100) configured to receive one or more objects;
   a horizontal bar (200) coupled with the pair of arms (100);
   a slide bar (300) coupled with the horizontal bar (200), wherein the slide bar (300) is configured to be displaced with respect to a housing (400,400') between a retracted state and an elongated state;
   a threaded rod (500) configured to pass within the slide bar (300) and the housing (400,400'); wherein the threaded rod (500) is rotatable in clockwise direction and counterclockwise direction;
   wherein the threaded rod (500) is configured to be rotated by an electric actuator;
   wherein the rotation of the threaded rod (500) displaces the slide bar (300) with respect to the housing (400, 400');
   an insert (700) coupled with the housing (400,400'), wherein the insert (700) is configured to be engaged to the hitch receiver of a vehicle;
   a wedge (209) on an inner surface of a bottom wall (204) of the horizontal bar (200); and
   wherein the wedge (209) limits the displacement of the slide bar (300) and further provides secure locking of the slide bar (300) in the retracted state to prevent rattles during transit of the object using the device (10, 20).

12. The device (10,20) according to claim 11, wherein the object comprises at least one of: a heavy luggage, a toolbox, a bike, a pallet, a wheelchair, a camping gear, and a hunting gear.

13. The device (10,20) according to claim 11, wherein each of the pair of arms (100) are configured to shift between an open state and a closed state;
   wherein in the closed state, the pair of arms (100) are substantially perpendicular to the ground and;
   wherein in the open state, the pair of arms (100) are placed substantially parallel to the ground and the pair of arms (100) are configured to carry at least one object.

14. The device (10,20) according to claim 13, wherein transition of each of the pair of arms (100) between the open state and the closed state is achieved by a coupling mechanism (207), wherein coupling mechanism (207) is configured to couple the pair of arms (100) with the horizontal bar (200), and the coupling mechanism (207) comprises a spring plunger pin (271), a clevis pin (272) and a cotter pin (273).

15. The device (10,20) according to claim 11, wherein the housing (400, 400') comprises a threaded rod arrangement (408, 408') configured to couple the threaded rod (500) with a distal end of the housing (400, 400').

16. The device (10,20) according to claim 15, wherein the threaded rod arrangement (408, 408') comprises a threaded shaft collar (481), a thrust plain bearing (482), a top lifting plate (483) and a thrust ball bearing (484).

17. The device (10,20) according to claim 15, wherein the threaded rod arrangement (408) further comprises a hex nut (485), wherein the hex nut (485) is configured to be rotated by using an electric actuator to control rotation of the threaded rod (500).

18. The device (10,20) according to claim 11, wherein the electric actuator is an electric motor (488) rotationally coupled to the distal end of the threaded rod (500).

19. The device (10,20) according to claim 17, wherein the electric actuator is a handheld drill motor.

20. The device (10,20) according to claim 11, wherein the housing (400) comprises a locking mechanism (409) configured to lock the slide bar (300) with the housing (400) when the slide bar (300) is in retracted state, wherein the locking mechanism (409) comprises a latch bolt (491), a spring (492), a latch link rod (493), a latch ferrule (494), a ball knob (495), a lock latch (496) and a cam lock (497).

21. The device (10,20) according to claim 11, wherein the slide bar (300) is configured to be in the retracted state when it is at least substantially housed within the housing (400); and the slide bar (300) is configured to be in the elongated state when it is at least substantially displaced out of the housing (400).

22. The device (10,20) according to claim 11, wherein the housing (400,400') further comprises a smoothening structure that comprises a roller (406), wherein during displacement of the slide bar (300) with respect to the housing (400,400'), the roller (406) comes in contact with the slide bar (300); wherein the smoothening structure is configured to enable reduced-friction displacement of the slide bar (300) with respect to the housing (400,400').

* * * * *